United States Patent [19]

Buchmann

[11] 4,257,551
[45] Mar. 24, 1981

[54] APPARATUS FOR PREPARING AND PROCESSING RECEIPTS FOR CUSTOMERS OF PARKING LOTS OR THE LIKE

[75] Inventor: Hans Buchmann, Oetwil, Switzerland

[73] Assignee: Zühlke Engineering AG, Schlieren, Switzerland

[21] Appl. No.: 22,317

[22] Filed: Mar. 20, 1979

[30] Foreign Application Priority Data

Mar. 21, 1978 [CH] Switzerland ............... 3063/78

[51] Int. Cl.³ .............................. G06K 1/08
[52] U.S. Cl. .................... 234/38; 101/19; 234/63; 234/131; 235/378
[58] Field of Search ............ 234/38, 35–37, 234/63, 64, 89, 131; 101/19; 235/378

[56] References Cited

U.S. PATENT DOCUMENTS

| 3,575,586 | 4/1971 | Kroll | 235/378 |
| 3,760,160 | 9/1973 | Gieringer | 235/378 |
| 3,775,593 | 11/1973 | Gieringer | 235/378 |

Primary Examiner—J. M. Meister
Attorney, Agent, or Firm—Peter K. Kontler

[57] ABSTRACT

A card which a customer receives at the time of driving the vehicle into a parking lot and which bears encoded information denoting the date and time of entry is processed when the customer desires to remove the vehicle. At such time, the card is inserted into a housing to be automatically advanced in a first direction past a reader which decodes the information and supplies signals to a computer which actuates a perforating device serving to apply legible information to at least one portion of the card. The card is thereupon moved in the opposite direction into the range of a severing device which separates the one portion from the remaining portion of the card. The one portion is removed by the customer to serve as a customer receipt, and the remaining portion is transported away from the severing device and into a safe to serve as an operator's receipt. The legible information normally includes the cost of parking.

12 Claims, 3 Drawing Figures

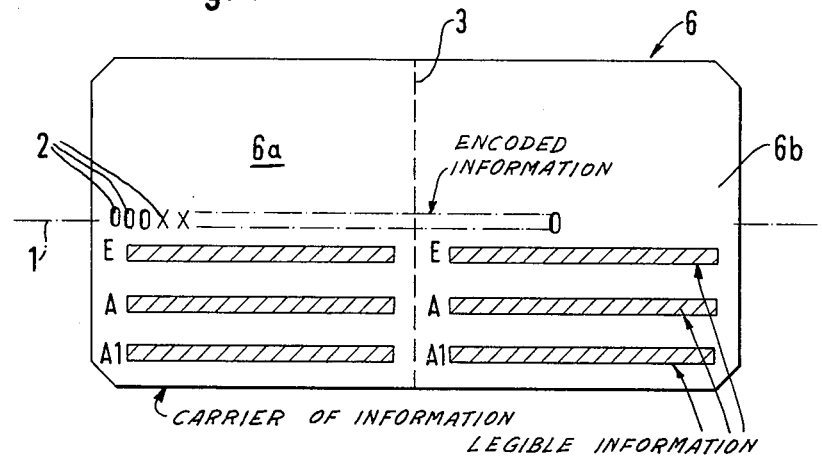
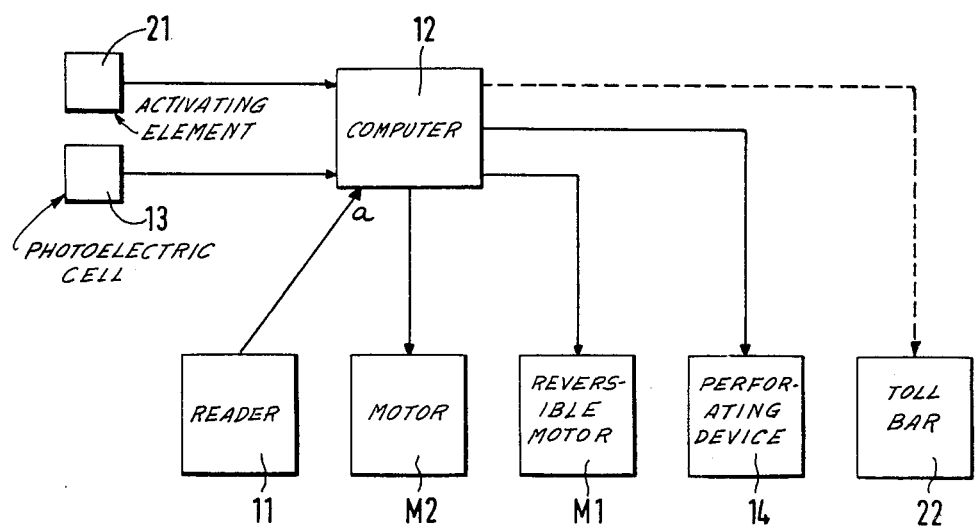

APPARATUS FOR PREPARING AND PROCESSING RECEIPTS FOR CUSTOMERS OF PARKING LOTS OR THE LIKE

BACKGROUND OF THE INVENTION

The present invention relates to apparatus for preparing and furnishing receipts for customers of municipal or private parking lots, indoor garages or analogous institutions.

It is already known to install a dispenser at the entrance to a parking area (hereinafter called parking lot for short) wherein the opening of a toll bar which normally extends across the lane for entry of vehicles must be preceded by withdrawal of a ticket or card from the dispenser. The card contains or can be provided with encoded information. For example, the driver of a vehicle which is about to enter the parking lot must withdraw a card from the dispensing machine (such card is partially dispensed by automatic means so that it can be readily grasped and fully withdrawn by the driver), and the withdrawal of a card entails the actuation of a mechanism which lifts the toll bar so that the vehicle can enter the parking lot.

The card is normally perforated and its holes denote certain information such as the date of arrival of the customer, the time of the day and/or others. The information is encoded in such a way that it can be decoded by a machine, i.e., by an automatic reader which transmits information to a computer for the purpose of calculating the charge at the time when the vehicle is to be removed from the parking lot. When the customer desires to remove the vehicle, he or she must hand the card to a clerk (cashier) or insert the card into an automatic cashing machine wherein the encoded information is decoded by the reader. The charge which must be paid is calculated by the computer, and the amount to be paid is indicated in a window, on a screen or the like. When the amount is paid, the customer receives a ticket or a token which can be used to cause the toll bar at the exit from the parking lot to open. Alternatively, the toll bar at the exit is opened by the clerk or by the computer which has processed the card. The ticket and/or token contains information which can be only decoded by a machine.

The just described systems exhibit the drawback that the customer does not have a receipt for his or her expenditures except, of course, if the card is accepted by a clerk who writes a receipt upon request. The preparation of a receipt consumes much time and is possible only when the parking area is attended, i.e., if a clerk is stationed at the exit.

It was also proposed to maintain a supply of tickets each of which has a detachable stub serving as a receipt to the customer. The tickets are stored in the cashier's office and are handed out to customers upon payment of the fee. The customer detaches the stub and utilizes the other part of the ticket as a token for initiating the lifting of the toll bar at the exit of the parking lot. A drawback of such proposal is that the clerk cannot open the toll bar at the exit, i.e., such operation is invariably performed by the customer who must insert a portion of the ticket into a slot which is provided therefor in or at the exit gate. Moreover, the printing of two-piece tickets certain portions (i.e., the aforediscussed stubs) of which are detachable to serve as receipts is expensive and the customer is likely to forget to detach the stub from the ticket.

OBJECTS AND SUMMARY OF THE INVENTION

An object of the invention is to provide a novel and improved apparatus for providing customer receipts independently of the mode of opening the toll bar at the exit of a parking lot or the like.

Another object of the invention is to provide an apparatus which utilizes simple and inexpensive carriers of information.

A further object of the invention is to provide for furnishing to customers of parking lots or the like receipts with readily interpretable information pertaining to the time and/or cost of parking.

One feature of the invention resides in the provision of an apparatus for converting a sheet-like carrier of information (e.g, a card) into two receipts. The apparatus comprises means for applying legible information to at least one portion of the carrier, and means for separating the one portion from the remaining portion of the carrier so that each of the thus separated portions of the carrier constitutes a discrete receipt and the entire legible information appears at least on that receipt which (prior to separation) constituted the one portion of the carrier.

The aforementioned applying means may comprises means for applying the entire legible information to each of the two carrier portions so that each receipt contains such legible information in its entirety.

The method may further comprise the step of applying to the carrier encoded information (e.g., in the form of perforations) a first part of which is applied to the one portion and a second part of which is applied to the remaining portion of the carrier. Thus, when the separating step is completed, each of the two receipts contains only the respective part of the encoded information.

The dimensions and/or configuration of one of the receipts may but need not match the dimensions and/or configuration of the other receipt.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a plan view of a card which can be converted into two receipts in accordance with the invention;

FIG. 3 is a circuit diagram of the apparatus of FIG. 2.

DESCRIPTION OF THE PREFERRED EMBODIMENTS

Figure 2:
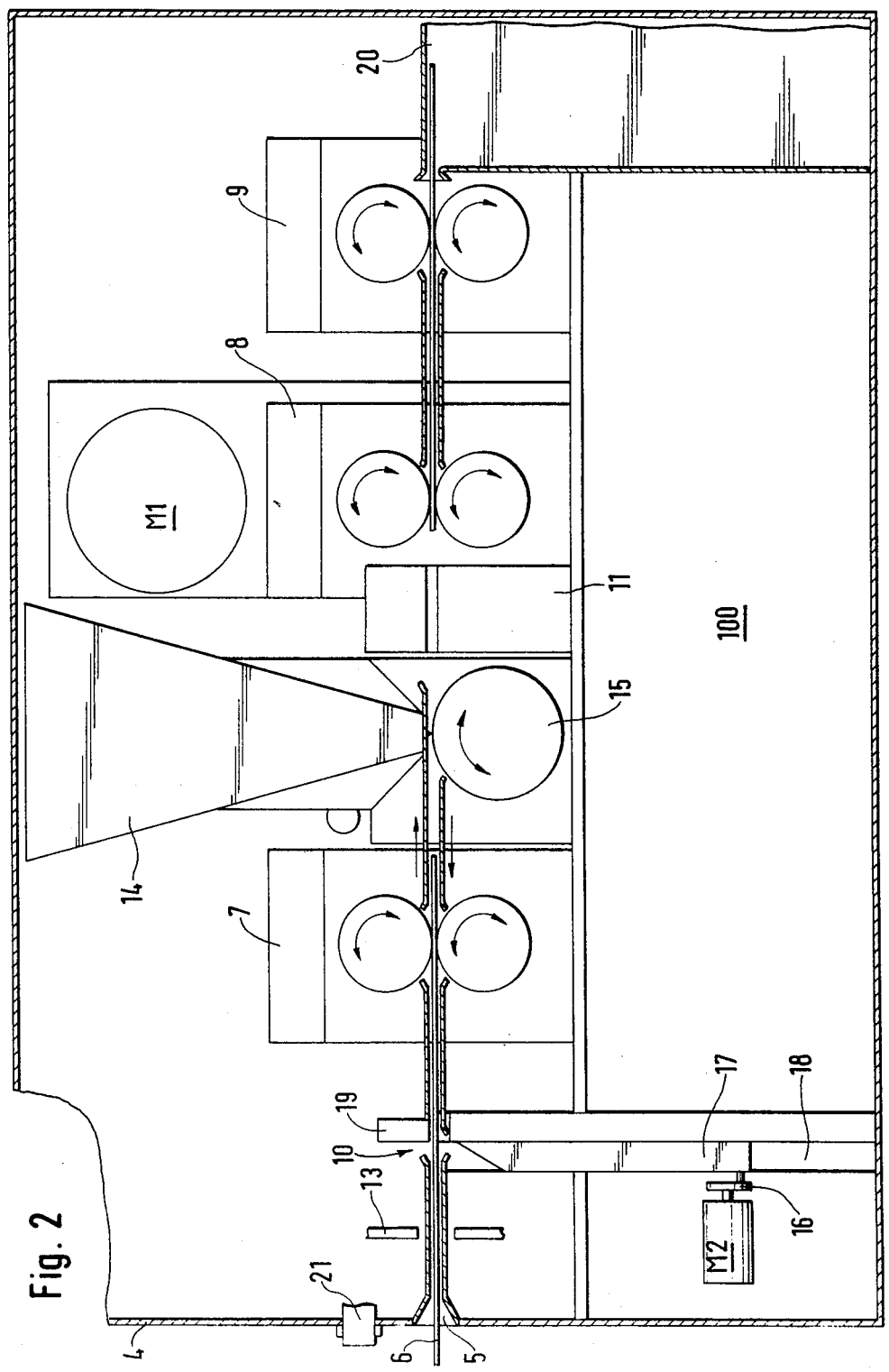
FIG. 2 is a schematic longitudinal vertical sectional view of an apparatus which embodies the invention.

FIG. 1 shows a sheet-like carrier 6 of information (hereinafter called card for short) the central longitudinal portion of which (extending along the phantom line I—I) is provided with spaces 2 for encoded information, preferably in the form of binary code. Such information can be decoded by an automatic reader. Furthermore, the card 6 includes two sets of fields (each of which includes a field E, a field A and a field A1) serving to receive and store readily legible (not encoded) information which can be read by a customer. The information in each field E may include the name and/or address of the parking lot, the information in each field A may include the date when the card 6 was received or removed by a customer, and each field A1 may include information denoting the time of the day when a customer drove her or his vehicle into the parking lot. The card 6 is received by the customer when the vehicle is delivered to the parking lot. The customer retains the card and presents it to an apparatus which is shown in FIGS. 2 and 3 when the vehicle is to be removed from the parking lot.

The reference character 3 denotes a line of separation where the card 6 can be severed so that one portion (e.g., the portion 6a) constitutes a receipt for the customer and the other portion (6b) constitutes a receipt for the owner or operator of the parking lot. The card 6 is severed along the line 3 subsequent to the application of legible information denoting the cost of parking, at least on that portion (6a) thereof which constitutes the customer receipt. Furthermore, the severing operation is carried out subsequent to the application of information to the fields E, A and A1 or, at the very least, to those fields which appear on the customer receipt 6a. In the embodiment which is shown in FIG. 1, the line 3 of separation is selected in such a way that each receipt contains a complete field E, A and A1. The line 3 need not extend exactly midway across the card 6, i.e., the two receipts (6a and 6b) need not be of identical size and/or shape. It is preferred to select the line 3 of separation in such a way that each receipt contains only a portion of information which is encoded at 2. This insures that a dishonest customer cannot attempt to doctor a complete card from two receipts 6a. The same holds true for the owner or operator of the parking lot and/or his employees. If the operator of the parking lot need not have a receipt (6b) with information which is as complete as that on the customer receipt 6a, that portion (6b) which constitutes a receipt for the operator can be simplified by omitting the insertion of information into the field E, A and/or A1. For example, the receipt 6b need not exhibit any information, except perhaps a serial number, if the operator merely wishes to prove that a certain number of vehicles were parked in the lot during a given period of time.

If desired, the card 6 can constitute a magnetizable carrier whereon the spots which are destined for reception of information in binary or other suitable code are applied by magnetizing in a manner well known from the art. An apparatus which can encode information on the card by making holes of selected size and in predetermined distribution is disclosed in commonly owned copending application Ser. No. 024,010 filed Mar. 26, 1979 by Hans Buchmann. The apparatus of the aforesaid application further comprises a printer which can apply legible (not encoded) information to the fields E, A and A1 on the receipt 6a and/or 6b.

FIGS. 2 and 3 illustrate the apparatus which receives cards 6 and processes them prior to subdivision into discrete portions or receipts 6a and 6b. The apparatus of FIGS. 2 and 3 comprises means for applying, at least to the receipt 6b, additional (legible) information which includes the charge or fee paid by the customer so that the customer can use the receipt 6b to prove actual expenditures for parking of her or his vehicle.

The apparatus of FIGS. 2 and 3 comprises a housing 4 having an inlet opening 5 for convenient insertion of the leader of a card 6. To this end, the inlet opening 5 preferably flares outwardly and guides the inserted card 6 into an elongated horizontal path 10 the first portion of which (immediately or closely downstream of the inlet opening 5) is monitored by a photoelectric detector 13. The housing 4 is mounted on a base 100 in the cashier's office or at the exit gate of a parking lot and is sufficiently stable to prevent tampering with its contents. The card 6 is inserted into the inlet opening 5(a) to ascertain the cost of parking and/or (b) to open the toll bar at the exit of the parking lot. A suitable toll bar is disclosed in commonly owned copending application (Ser. No. 971,356 filed Dec. 20, 1978 by Hans Buchmann.

When the leader of a freshly inserted card 6 advances into the gap between the light source and the transducer of the photocell 13, the transducer transmits a signal to a signal processing circuit which is preferably a commercially available computer 12 (shown in FIG. 3) and which starts a reversible motor M1 for three pairs of advancing rolls 7, 8 and 9. The motor M1 and the rolls 7-9 constitute a unit which can transport a card 6 or a portion of such card along the path 10 in directions away from and toward the opening 5. As the leader of the card 6 continues to move along the path 10 (in response to finger pressure against its trailing end), such leader enters the nip of the first pair of advancing rolls 7 which are then driven to advance the card 6 in a (first) direction to the right, as viewed in FIG. 2. The rolls 8 engage the leader of the inserted card 6 before the trailing end of such card advances beyond the nip of the rolls 7, and the same holds true for the rolls 9 and 8. Thus, the inserted card 6 is transported all the way to the right-hand end of the path 10.

On its way along the path 10, the card 6 passes through a reader 11 which constitutes a means for decoding the information (2) on the card and transmits appropriate signals to the computer 12. When the forward progress of the card 6 along the path 10 is terminated, the computer 12 transmits to the motor M1 a signal which causes the motor M1 to rotate the advancing rolls 7, 8 and 9 in reverse so that the card begins to move in the opposite direction, i.e., toward the opening 5. The card 6 passes through an information applying device 14, e.g., a device which perforates the card to apply thereto legible information which is supplied by the computer 12. Such information includes the cost of parking plus the application of information to the fields E, A and/or A1 if such information was not applied to the card 6 prior to insertion into the path 10. The needles of the perforating device 14 cooperate with a roller-shaped anvil or back support 15 to perforate the card 6. During transport of the card 6 back toward the opening 5, the peripheral speed of the anvil 15 (which then rotates in a counterclockwise direction, as viewed in FIG. 2) matches the speed of rearward movement of the card. For example, the anvil 15 can be driven by the motor M1 to rotate clockwise while the card 6 moves in a direction to the right, and to rotate counterclockwise while the card moves in the opposite direction. It will be noted that the card 6 is in continuous motion during travel in a direction to the right or in a direction to the left, as viewed in FIG. 2.

The photocell 13 generates a signal when the rear end of the card 6 moves toward the opening 5, and the signal is transmitted to the computer 12 which arrests the motor M1 with a certain delay so that the rear end of the card 6 (namely, a part of the receipt 6a) extends outwardly beyond the opening 5, i.e., the receipt 6a (which is still integral with the receipt 6b) is accessible. At the same time, the computer 13 transmits a signal to a second motor M2 which moves a reciprocable knife 17 of a severing or separating unit by way of an eccentric drive 16 so that the knife 17 advances in a vertical guide channel 18 and cooperates with a stationary counterknife 19 to sever the card 6 along the line 3. When the severing or separating step is completed, the motor M2 is arrested while the mobile knife 17 dwells in its upper end position so that it prevents removal or expulsion of the operator's receipt 6b. The customer then withdraws the separated receipt 6a whereby the photocell 13 transmits a signal which causes the computer 12 to operate the motor M2 in reverse (or to restart the motor M2 in the same direction, depending on the design of the eccentric drive 16) so that the knife 17 reassumes its lower end position which is shown in FIG. 2. At the same time, the computer 12 starts the motor M1 so as to advance the receipt 6b in a (first) direction to the right whereby the receipt 6b drops into a repository or safe 20 as soon as it advances beyond the nip of the last pair of advancing rolls 9. The apparatus is then ready for reception and processing of the next-following card 6. Such card is inserted into the opening 5 to actuate the photocell 13 which causes the computer 12 to start the motor M1 in a direction to transport the freshly inserted card 6 toward the advancing rolls 9, and so forth.

FIG. 2 further shows an activating element 21 (e.g., a pushbutton) which is adjacent to the inlet opening 5 and is depressed by a customer under the following circumstances: The computer 12 can be designed in such a way that it automatically transmits to the motors M1 and M2 a series of signals in the aforedescribed sequence only if the customer desires to have a receipt (6a). Thus, depression of the pushbutton 21 will result in forward movement of an inserted card 6 to the right-hand end of the path 10 and thereupon in a movement in the opposite direction so that the customer can withdraw the separated receipt 6a. If the customer who has inserted a card 6 does not depress the pushbutton 21, the card 6 is simply scanned by the reader 11 and is provided (if necessary) with information which is applied by the perforating device 14. The card is thereupon dropped into the safe 20.

The computer 12 can be programmed to open a toll bar 22 at the exit of the parking lot as soon as the reader 11 transmits decoded information to the corresponding input a. This is an optional feature of the invention and can be resorted to regardless of whether or not the apparatus is provided with the aforediscussed activating pushbutton 21. Thus, the toll bar 22 is opened as soon as the customer inserts a card 6 to such an extent that the card can advance into the range of the reader 11. The toll bar 22 may be of the type as disclosed in the aforementioned copending application Ser. No. 971,356.

If desired, the card 6 can be manipulated by an attendant at the exit gate of a parking lot. Such attendant can accept the fee from the customer prior to initiating the movement of the toll bar 22 to open position. In fact, the attendant can remove the entire card 6 from the housing 4 and insert it into a discrete severing or cutting device which separates the portion 6a (customer receipt) from the remaining portion 6b (operator's receipt). In each instance, at least that portion (6a) of the card 6 which constitutes customer receipt is provided with legible information so as to enable the customer to document his expenses for parking of the vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for converting a sheet-like carrier of encoded information into two receipts, comprising transporting means defining a predetermined path for the carrier; signal generating means for decoding the information on the carrier in said path; means for processing the signals which are generated by said decoding means; means for applying to at least one portion of the carrier legible second information on the basis of processed signals; and means for separating said one portion of the carrier in said path from the remaining portion so that each of said portions constitutes a discrete receipt and at least one of said receipts bears the entire legible second information.

2. The apparatus of claim 1, further comprising means defining an opening through which a carrier can be admitted into said path, said transporting means including means for moving said one portion of the carrier in said path to a position in which said one portion is accessible for manual withdrawal from said path subsequent to separation from said remaining portion of the carrier.

3. The apparatus of claim 2, further comprising a repository for the remaining portion of the carrier in said path, said transporting means being operative to admit such remaining portion into said repository subsequent to separation of said one portion therefrom.

4. The apparatus of claim 3, further comprising prime mover means for operating said transporting means in a first direction to thereby advance a carrier in said path past said decoding and information applying means toward said repository and in a second direction to thereby advance the carrier in said path into the range of said separating means.

5. The apparatus of claim 4, wherein said path has a first end in the region of said opening and a second end in the region of said repository.

6. The apparatus of claim 5, wherein said one portion of the carrier in said path is accessible for manual withdrawal from said path via said opening.

7. The apparatus of claim 6, wherein said separating means is adjacent to said opening.

8. The apparatus of claim 1, wherein said processing means is a computer which receives signals from said decoding means and transmits signals to said transporting and information applying means.

9. The apparatus of claim 1, wherein said carrier is a card which bears encoded information prior to introduction into said path, said information applying means comprising a perforating device which applies legible information to said one as well as to said remaining portion of the card in said path.

10. The apparatus of claim 1, wherein said path is a straight path and said transporting means includes a plurality of advancing rolls and a reversible prime mover for said rolls, said processing means being activatable to start said prime mover so as to drive said rolls in a first direction in response to insertion of a carrier into said path and to thus advance the carrier past said decoding and information applying means, to thereupon reverse said prime mover so as to move the carrier in the opposite direction and into the range of said separating means, and to again reverse said prime mover so as to advance said remaining portion of the carrier in said first direction and away from said separating means.

11. The apparatus of claim 1, further comprising manually operable means for activating said processing means.

12. The apparatus of claim 11, wherein said path is elongated and said activating means is adjacent to one end of said path.

* * * * *